(12) United States Patent
Finnigan

(10) Patent No.: US 8,110,937 B2
(45) Date of Patent: Feb. 7, 2012

(54) WAVE ENERGY CAPTURING DEVICE

(75) Inventor: Timothy Donegal Finnigan, Waverley (AU)

(73) Assignee: Biopower Systems Pty. Ltd. (AU)

( * ) Notice: Subject to any disclaimer, the term of this patent is extended or adjusted under 35 U.S.C. 154(b) by 841 days.

(21) Appl. No.: 12/063,627

(22) PCT Filed: Aug. 11, 2006

(86) PCT No.: PCT/AU2006/001149
§ 371 (c)(1),
(2), (4) Date: May 16, 2008

(87) PCT Pub. No.: WO2007/019608
PCT Pub. Date: Feb. 22, 2007

(65) Prior Publication Data
US 2010/0156106 A1    Jun. 24, 2010

(30) Foreign Application Priority Data

Aug. 12, 2005 (AU) ................ 2005904359
Jul. 26, 2006 (AU) ................ 2006904031

(51) Int. Cl.
F03B 13/10 (2006.01)
F03B 13/12 (2006.01)
H02P 9/04 (2006.01)
(52) U.S. Cl. .......................... 290/53; 290/42
(58) Field of Classification Search ............. 290/53, 290/42
See application file for complete search history.

(56) References Cited

U.S. PATENT DOCUMENTS

| 523,963 | A | * | 7/1894 | Gerlach | 416/6 |
| 616,468 | A | * | 12/1898 | Jones | 417/330 |
| 1,318,650 | A | * | 10/1919 | Dukta | 441/20 |
| 1,624,349 | A | * | 4/1927 | Mann et al. | 416/6 |
| 3,894,241 | A | * | 7/1975 | Kaplan | 290/42 |
| 4,002,416 | A | * | 1/1977 | Axford | 417/330 |
| 4,170,738 | A | * | 10/1979 | Smith | 290/42 |
| 4,228,360 | A | * | 10/1980 | Navarro | 290/43 |
| 4,264,233 | A | * | 4/1981 | McCambridge | 405/26 |
| 4,371,788 | A | * | 2/1983 | Smith, Jr. | 290/42 |
| 4,380,417 | A |   | 4/1983 | Fork | 416/108 |

(Continued)

FOREIGN PATENT DOCUMENTS

DE     10104382 A1    8/2002

(Continued)

*Primary Examiner* — Pedro J Cuevas
(74) *Attorney, Agent, or Firm* — McDonnell Boehnen Hulbert & Berghoff LLP

(57) ABSTRACT

A wave energy capturing device (10) comprising a base (12) adapted for fixed connection to a submerged surface (14). At least one elongate buoyant paddle (26) is pivotally mounted to the base (12) about a first pivotal axis (22), for angular oscillation through an angle range when wave motion applies a force to the paddle (26). The paddle (26) has a longitudinal axis (27), an upper end portion and a lower end portion. An energy transfer member is attached to the paddle (26) and is adapted to be driven by the angular oscillation of the paddle (26). A paddle adjustment assembly is associated with the paddle (26) and is adapted to adjust the angle range of the paddle (26) in magnitude and/or angular position relative to the first pivotal axis (22).

20 Claims, 5 Drawing Sheets

U.S. PATENT DOCUMENTS

| | | | |
|---|---|---|---|
| 4,580,400 A * | 4/1986 | Watabe et al. | 60/398 |
| 4,976,570 A * | 12/1990 | Davis et al. | 405/79 |
| 5,084,630 A | 1/1992 | Azimi | 290/53 |
| 5,708,305 A * | 1/1998 | Wolfe | 290/53 |
| 6,139,750 A * | 10/2000 | Graham | 210/652 |
| 6,184,590 B1 * | 2/2001 | Lopez | 290/53 |
| 6,210,072 B1 * | 4/2001 | Marelius | 405/100 |
| 6,231,268 B1 * | 5/2001 | Hausenbauer | 405/61 |
| 6,652,232 B2 | 11/2003 | Bolduc | 416/24 |
| 6,925,800 B2 | 8/2005 | Hansen et al. | 60/497 |
| 7,023,104 B2 * | 4/2006 | Kobashikawa et al. | 290/42 |
| 7,131,269 B2 * | 11/2006 | Koivusaari | 60/495 |
| 7,411,311 B2 * | 8/2008 | Tal-or | 290/53 |
| 7,834,474 B2 * | 11/2010 | Whittaker et al. | 290/53 |
| 7,839,009 B2 * | 11/2010 | Rink | 290/54 |
| 7,964,984 B2 * | 6/2011 | Saavedra | 290/55 |
| 2003/0155774 A1 * | 8/2003 | Chalmers et al. | 290/53 |
| 2004/0007881 A1 * | 1/2004 | Kobashikawa et al. | 290/53 |
| 2005/0066654 A1 * | 3/2005 | Koivusaari | 60/398 |
| 2006/0150626 A1 * | 7/2006 | Koivusaari et al. | 60/499 |
| 2008/0057802 A1 * | 3/2008 | Wilkinson | 440/101 |
| 2008/0191485 A1 * | 8/2008 | Whittaker et al. | 290/53 |
| 2010/0084870 A1 * | 4/2010 | Burcik | 290/54 |
| 2010/0140933 A1 * | 6/2010 | Finnigan | 290/43 |
| 2010/0237625 A1 * | 9/2010 | Dempster | 290/54 |
| 2011/0018276 A1 * | 1/2011 | Whittaker et al. | 290/53 |

FOREIGN PATENT DOCUMENTS

| | | |
|---|---|---|
| GB | 2308835 A * | 7/1997 |
| JP | 2003-097408 | 3/2003 |
| JP | 2003-97408 | 4/2003 |
| WO | 98/17911 A1 | 4/1998 |
| WO | 00/52331 A1 | 9/2000 |
| WO | 2004/097212 A1 | 11/2004 |

* cited by examiner

WAVE ENERGY CAPTURING DEVICE

FIELD OF THE INVENTION

The present invention relates to wave energy capturing devices.

The present invention has been developed primarily for use in capturing ocean wave energy for electricity generation. However, it will be appreciated that the invention is not limited to this particular application and may also be fitted with a reciprocating seawater pump to create high pressure seawater to be used for desalination or for driving other external devices.

BACKGROUND OF THE INVENTION

Known wave energy capturing devices include a base and a paddle pivotally connected to the base. The paddle is driven to pivotally oscillate about a generally horizontal axis, in response to ocean wave forces, to drive a generator. The paddle is typically a solid plate. The paddle has a fixed alignment, and accordingly, pivots only in a fixed plane. The paddle also maintains a fixed operative range of motion regardless of prevailing ocean conditions.

The magnitude and direction of wave forces applied to known wave energy capturing devices varies depending on prevailing ocean conditions. The wave forces can be very low in calm ocean conditions and extremely high in extreme ocean conditions, such as during hurricanes and cyclones. Known devices survive the extremely high wave forces associated with extreme ocean conditions either by being made strong enough to withstand the high forces, or being designed to avoid a large amount of the wave forces, or by a combination of both.

A disadvantage of making wave energy capturing devices strong enough to withstand extremely high wave forces is that the devices tend to be very large and heavy.

A disadvantage of designing the devices to avoid a large amount of the wave force, in order to handle extreme ocean conditions, is that the devices operate less efficiently in calmer ocean conditions.

A further disadvantage of known wave energy capturing devices is that they operate inefficiently when the direction of wave propagation moves out of alignment with the fixed alignment of the paddle.

Another disadvantage of known wave energy capturing devices is that the solid paddle tends to reflect, rather than capture, wave energy.

OBJECT OF THE INVENTION

It is the object of the present invention to substantially overcome or at least ameliorate one or more of the above disadvantages.

SUMMARY OF THE INVENTION

Accordingly, in a first aspect, the present invention provides a wave energy capturing device comprising:
 a base adapted for fixed connection to a submerged surface;
 at least one elongate buoyant paddle having a longitudinal axis, an upper end portion and a lower end portion, said paddle being pivotally mounted to said base, about a first pivotal axis, for angular oscillation through an angle range when wave motion applies a force to said paddle;
 an energy transfer member attached to said paddle and adapted to be driven by the angular oscillation of said paddle; and
 a paddle adjustment assembly associated with the paddle and adapted to adjust said angle range in magnitude and/or angular position relative to said first pivotal axis.

Preferably, a machine is connected to said energy transfer member for extracting energy from oscillatory motion of said paddle. The machine is preferably adapted to receive a torque from said energy transfer member. The machine can preferably function as both a motor and a generator. More preferably, said machine incorporates a permanent magnet synchronous motor/generator. In a preferred form, said motor/generator is completely sealed, and may be filled with inert gas under pressure, to prevent internal corrosion or leaking.

Preferably, the paddle adjustment assembly includes a sensor for sensing a value indicative of the wave forces applied to the paddle. More preferably, the paddle adjustment assembly includes a controller, responsive to said sensor, which is adapted to transmit a signal to adjust the angle range if the value sensed falls outside a predetermined range. The controller is preferably adapted to control the application of external power to the machine to move the paddle into a configuration in which the wave forces applied to said paddle are reduced if the value sensed is indicative of wave forces that may damage the device.

Preferably, the configuration in which the wave forces applied to said paddle are reduced is a configuration in which the mean position of the longitudinal axis of the paddle is further inclined relative to a vertical plane drawn perpendicular to the direction of wave propagation. Depending on the value indicated by the sensor, the paddle may be moved into and maintained in a configuration substantially parallel to the direction of wave propagation to minimise the wave forces applied to the paddle.

The controller is also preferably adapted to control the application of external power to said machine to move the paddle into a configuration in which the wave forces applied to said paddle are increased if the value sensed by the sensor is indicative of wave forces that will not damage the device and which are less than optimal in terms of energy capturing efficiency. Preferably, the configuration in which the wave forces applied to said paddle is increased is a configuration in which the mean position of the longitudinal axis of the paddle is raised relative to parallel to the direction of wave propagation.

Preferably, said paddle includes an array of spaced apart blades. More preferably, said blades are spaced apart generally along said first pivotal axis. In a preferred form, the array of blades fans outwardly from an end closest the base to an opposite free end. In one embodiment, the blades are provided with substantially streamlined leading edges. However, in another embodiment, said blades are provided with generally oblique leading edges.

Preferably, said paddle is self-orienting with respect to the direction of wave propagation. More preferably, said paddle is also adapted to be pivotally mounted relative to the submerged surface about a second pivotal axis, which is generally perpendicular to said first pivotal axis. In one embodiment, the base is adapted to be pivotally mounted to the submersed surface about said second pivotal axis. However, in other embodiments, the base is adapted to be fixed to the submerged surface and the paddle is pivotally mounted to the base about said second pivotal axis.

Preferably, an axle is pivotally connected to said base about said first pivotal axis and said paddle is fixedly connected to and extends from said axle. The axle is preferably connected to the base via a bracket that is rotatably mounted to said base about said second pivotal axis. In a preferred form, water lubricated bearings are provided between said axle and said base.

Preferably, in use, said first pivotal axis is substantially horizontal and said second pivotal axis is substantially vertical.

In a second aspect, the present invention provides a wave energy capturing device comprising:

a base adapted for fixed connection to a submerged surface; and at least one elongate buoyant paddle having a longitudinal axis, an upper end portion and a lower end portion, said paddle being pivotally mounted to said base, about a first pivotal axis, for angular oscillation through an angle range when wave motion applies a force to said paddle, said paddle also adapted to be pivotally mounted relative to the submerged surface about a second pivotal axis, which is generally perpendicular to said first pivotal axis, so as to be self-orienting with respect to a direction of wave propagation;

an energy transfer member attached to said paddle and adapted to be driven by the angular oscillation of said paddle.

In one embodiment, the base is adapted to be pivotally mounted to the submerged surface. However, in other embodiments, the base is adapted to be fixed to the submerged surface and the paddle is adapted to be pivotally mounted to the base about said second pivotal axis.

Preferably, a machine is connected to said paddle for extracting energy from oscillatory motion of said paddle. The machine is preferably adapted to receive a torque from said energy transfer member. The machine can preferably function as both a motor and a generator. More preferably, said machine incorporates a permanent magnet synchronous motor/generator. In a preferred form, said motor/generator is completely sealed, and may be filled with inert gas under pressure, to prevent internal corrosion or leaking.

Preferably, a paddle adjustment assembly is associated with the paddle and adapted to adjust said angle range in magnitude and/or angular position relative to said first pivotal axis. More preferably, the paddle adjustment assembly includes a sensor for sensing a value indicative of the wave forces applied to the paddle. In a preferred form, the paddle adjustment assembly includes a controller, responsive to said sensor, which is adapted to transmit a signal to adjust said angle range if the value sensed falls outside a predetermined range. The controller is preferably adapted to control the application of external power to the machine to move the paddle into a configuration in which the wave forces applied to said paddle are reduced if the value sensed is indicative of wave forces that may damage the device.

Preferably, the configuration in which the wave forces applied to said paddle is reduced is a configuration in which the mean position of the longitudinal axis of the paddle is further inclined relative to a vertical plane drawn perpendicular to the direction of wave propagation. Depending on the value indicated by the sensor, the paddle may be moved into and maintained in a configuration substantially parallel to the direction of wave propagation to minimise the wave forces applied to the paddle.

The controller is also preferably adapted to control the application of external power to said machine to move the paddle into a configuration in which the wave forces applied to said paddle are increased if the value sensed is indicative of wave forces that will not damage the device and which are less than optimal in terms of energy capturing efficiency.

Preferably, the configuration in which the wave forces applied to said paddle is increased is a configuration in which the mean position of the longitudinal axis of the paddle is raised relative to parallel to the direction of wave propagation.

Preferably, said paddle includes an array of spaced apart blades. More preferably, said blades are spaced apart generally along said first pivotal axis. In a preferred form, the array of blades fans outwardly from an end closest the base to an opposite free end. In one embodiment, the blades are provided with substantially streamlined leading edges.

However, in another embodiment, said blades are provided with generally oblique leading edges.

Preferably, an axle is pivotally connected to said base about said first pivotal axis and said paddle is fixedly connected to and extends from said axle. The axle is preferably connected to the base via a bracket that is pivotally mounted to said base about said second pivotal axis. In a preferred form, water lubricated bearings are provided between said axle and said base.

Preferably, in use, said first pivotal axis is substantially horizontal and said second pivotal axis is substantially vertical.

In a third aspect, the present invention provides a wave energy capturing device comprising:

a base adapted for fixed connection to a submerged surface; and at least one elongate buoyant paddle having an array of spaced apart blades, said paddle having a longitudinal axis, an upper end portion and a lower end portion and being pivotally mounted to said base, about a first pivotal axis for angular oscillation through an angle range when wave motion applies a force to said paddle; and an energy transfer member attached to said paddle and adapted to be driven by the angular oscillation of said paddle.

Preferably, a machine is connected to said paddle for extracting energy from oscillatory motion of said paddle. The machine is preferably adapted to receive a torque from said energy transfer member. The machine can preferably function as both a motor and a generator. More preferably, said machine incorporates a permanent magnet synchronous motor/generator. In a preferred form, said motor/generator is completely sealed, and may be filled with inert gas under pressure, to prevent internal corrosion or leaking.

Preferably, a paddle adjustment assembly is associated with the paddle and adapted to adjust said angle range in magnitude and/or angular position relative to said first pivotal axis. More preferably, the paddle adjustment assembly includes a sensor for sensing a value indicative of the wave forces applied to the paddle. In a preferred form, the paddle adjustment assembly includes a controller, responsive to said sensor, which is adapted to transmit a signal to adjust the range of motion of the paddle if the value sensed falls outside a predetermined range. The controller is preferably adapted to control the application of external power to the machine to move the paddle into a configuration in which the wave forces applied to said paddle are reduced if the value sensed is indicative of wave forces that may damage the device.

Preferably, the configuration in which the wave forces applied to said paddle is reduced is a configuration in which the mean position of the longitudinal axis of the paddle is further inclined relative to a vertical plane drawn perpendicular to the direction of wave to propagation. Depending on the value indicated by the sensor, the paddle may be moved into and maintained in a configuration substantially parallel to the direction of wave propagation to minimise the wave forces applied to the paddle.

The controller is also preferably adapted to control the application of external power to said machine to move the paddle into a configuration in which the wave forces applied to said paddle are increased if the value sensed by the sensor is indicative of wave forces that will not damage the device and which are less than optimal in terms of energy capturing efficiency. Preferably, the configuration in which the wave forces applied to said paddle is increased is a configuration in which the mean position of the longitudinal axis of the paddle is raised relative to parallel to the direction of wave propagation.

Preferably, said blades are spaced apart generally along said first pivotal axis. In a preferred form, the array of blades fans outwardly from an end closest the base to an opposite free end. In one embodiment, the blades are provided with substantially streamlined leading edges. However, in another embodiment, said blades are provided with generally oblique leading edges.

Preferably, said paddle is self-orienting with respect to the direction of wave propagation. More preferably, said paddle is also adapted to be pivotally mounted relative to the submerged surface about a second pivotal axis, which is generally perpendicularly to said first pivotal axis. In one embodiment, the base is pivotally mounted to the submerged surface. However, in other embodiments, the base is fixed to the submerged surface and the paddle is pivotally mounted to the base about said second pivotal axis.

Preferably, an axle is pivotally connected to said base about said first pivotal axis and said paddle is fixedly connected to and extends from said axle. The axle is preferably connected to the base via a bracket that is pivotally mounted to said base about said second pivotal axis. In a preferred form, water lubricated bearings are provided between said axle and said base.

Preferably, in use, said first pivotal axis is substantially horizontal and said second pivotal axis is substantially vertical.

In a fourth aspect, the present invention provides a wave energy capturing device comprising:
 a base adapted for fixed connection relative to a submerged surface;
 at least one elongate buoyant paddle having an array of spaced apart blades, said paddle having a longitudinal axis, an upper end portion and a lower end portion and being pivotally mounted to said base, about a first pivotal axis for angular oscillation through an angle range when wave motion applies a force to said paddle, said paddle also adapted to be pivotally mounted relative to the submerged surface about a second pivotal axis, which is generally perpendicularly to said first pivotal axis, so as to be self-orienting with respect to a direction of wave propagation; and
 an energy transfer member attached to said paddle and adapted to be driven by the angular oscillation of said paddle.

In a fifth aspect, the present invention provides a wave energy capturing device comprising:
 a base adapted for fixed connection relative to a submerged surface;
 at least one elongate buoyant paddle having a longitudinal axis, an upper end portion and a lower end portion, said paddle being pivotally mounted to said base, about a first pivotal axis for angular oscillation through an angle range when wave motion applies a force to said paddle, said paddle also adapted to be pivotally mounted relative to the submerged surface about a second pivotal axis, which is generally perpendicularly to said first pivotal axis, so as to be self-orienting with respect to a direction of wave propagation;
 an energy transfer member attached to said paddle and adapted to be driven by the angular oscillation of said paddle; and
 a paddle adjustment assembly associated with the paddle and adapted to adjust said angle range in magnitude and/or angular position relative to said first pivotal axis.

In a sixth aspect, the present invention provides a wave energy capturing device comprising:
 a base adapted for fixed connection relative to a submerged surface;
 at least one elongate buoyant paddle having an array of spaced apart blades, said paddle having a longitudinal axis, an upper and portion and a lower end portion, said paddle being pivotally mounted to said base, about a first pivotal axis, for angular oscillation through an angle range when wave motion applies a force to said paddle;
 an energy transfer member attached to said paddle and adapted to be driven by the angular oscillation of said paddle; and
 a paddle adjustment assembly associated with the paddle and adapted to adjust said angle range in magnitude and/or angular position relative to said first pivotal axis.

In a seventh aspect, the present invention provides a wave energy capturing device comprising:
 a base adapted for fixed connection relative to a submerged surface;
 at least one elongate buoyant paddle having an array of spaced apart blades, said paddle having a longitudinal axis, an upper end portion and a lower end portion, said paddle being pivotally mounted to said base, about a first pivotal axis, for angular oscillation through an angle range when wave motion applies a force to said paddle, said paddle also being pivotally mounted relative to the submerged surface about a second pivotal axis, which is generally perpendicularly to said first pivotal axis, so as to be self-orienting with respect to a direction of wave propagation;
 an energy transfer member attached to said paddle and adapted to be driven by the angular oscillation of said paddle; and
 a paddle adjustment assembly associated with the paddle and adapted to adjust said angle range in magnitude and/or angular position relative to said first pivotal axis.

BRIEF DESCRIPTION OF THE DRAWINGS

A preferred embodiment of the present invention will now be described, by way of an example only, with reference to the accompanying drawings, wherein.

DETAILED DESCRIPTION OF THE PREFERRED EMBODIMENTS

Figure 1:
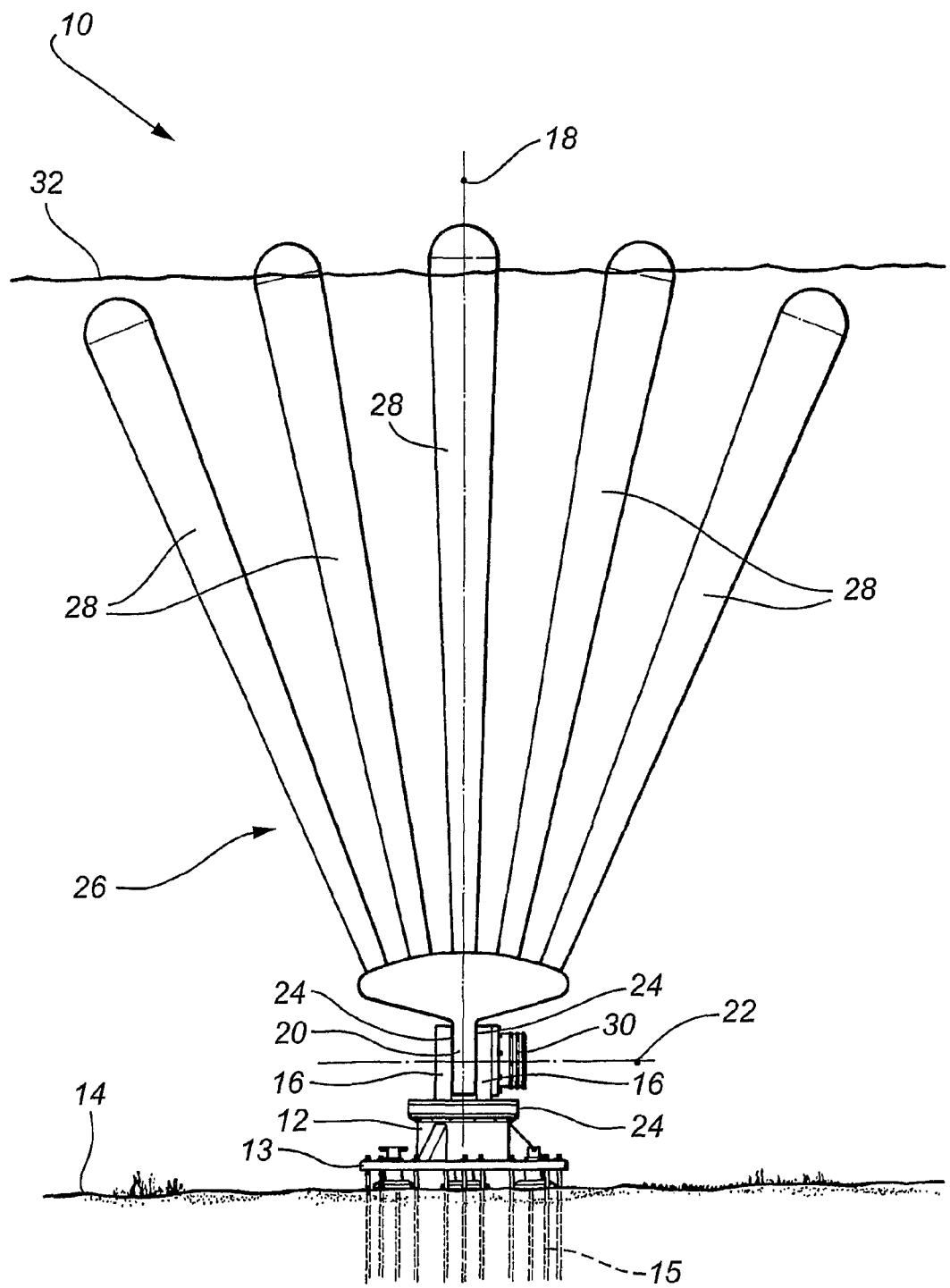
FIG. 1 is a schematic front elevational view of a preferred embodiment of a wave energy capturing device according to the present invention.

Referring to the drawings, the wave energy capturing device 10 comprises a base 12 having a circular mounting flange 13 adapted for fixed connection to a submerged surface (i.e. the seabed) 14 by a plurality of anchor bolts 15. A bracket 16 is rotatably mounted to the base 12 about a pivotal axis 18 extending generally perpendicularly (i.e. vertically) from the ocean floor 14. An axle 20 is pivotally mounted to the bracket 16 about a pivotal axis 22 extending generally parallel (i.e. horizontally) to the submerged surface 14. Water lubricated bearings 24 are provided between the bracket 16 and the base 12, as well as between the axle 20 and the bracket 16.

An elongate buoyant paddle 26, having a longitudinal axis 27 is fixedly connected at one end to the axle 20 and has an opposite free end. Accordingly, the paddle 26 is pivotable relative to the base 12 and the submerged 14 about both axes 18 and 22. The paddle 26 is adapted to angularly oscillate through an angle range about axis 22 when wave motion applies a force to the paddle 26.

The paddle 26 includes an array of smooth-surfaced blades 28 spaced apart generally linearly along the axis 22. The array of blades 28 fans outwardly from an end closest the base 12 to an opposite free end. This fanning out of the blades 28, combined with the pivotal mounting of the paddle 26 about axes 18 and 22, causes the paddle 26 to self-orient with the direction of wave propagation to maximise the amount of wave force captured.

The blades 28 are also optimally spaced, such that water passes around and between the blades 28 in such a manner as to create the highest possible forces for the prevailing conditions. This spaced arrangement of blades 28 also allows a large portion of the energy in each wave to be absorbed, with minimal reflection occurring. If a single, wide blade was used instead of an array, then most of the wave energy would be reflected from the solid central portion of the wide blade.

The blades 28 are preferably provided with substantially streamlined leading edges, as shown in FIGS. 1 to 4. The streamlined blades preferentially transfer forces due to the acceleration of the wave motion, while minimising the opposing drag forces. In many situations, this leads to optimal efficiency. In other situations, it may be desired to preferentially harness the drag forces, in which case blades with oblique leading edges, such as shown in FIGS. 5 to 8, are preferred. The blade 28 shapes, rigidities, spacings and buoyancies can be optimised by experimentation to maximise the energy conversion in any given wave conditions for any particular geographical location.

Angular oscillation of the paddle 26 about axis 22 drives an energy transfer member, in the form of a shaft (not shown) extending from the axle 20. The shaft drives the rotor of a machine in the form of a permanent magnet synchronous motor/generator 30. The motor/generator 30 is completely sealed, and may be filled with inert gas under pressure, to prevent internal corrosion or leaking. The motor/generator 30 is exposed to an electrical load, such that a torque is established to resist the applied torque created by the wave forces. When the axle 20 angularly oscillates against this resisting torque, the motor/generator 30 produces electrical power for supplying to a distribution grid. In certain circumstances, it may be desirous to drive the axle 20 against wave forces or to hold the paddle 26 at a fixed position in the presence of varying forces. This effect is achieved by supplying the motor/generator 30 with power from the distribution grid, such that the motor/generator 30 drives the paddle 26.

In use, the paddle blades 28 capture and convert wave forces in at least three ways. Firstly, as a wave crest approaches the array of blades 28, the flow of water past the array is partially restricted resulting in a momentary build up of water on the seaward side of the array. This in turn causes a net force on the blades 28 in the direction of wave propagation. This force is translated along the blades 28 to the axle 20 and contributes to the angular oscillation over part of the wave cycle. The effect described here constitutes a conversion of the potential energy in the waves (which is due to the height difference between wave crests and troughs) to mechanical energy in the axle 20.

A second mode of energy capture is a direct conversion of the drag forces on the blades 28 due to the oscillating flow beneath the passing waves. This oscillating flow imparts drag forces on the blades 28 that are translated along the blades 28 to the axle 20 and which contribute to the controlled angular oscillation of the axle 20. This action constitutes direct conversion of the kinetic energy contained in the wave field and embodied in the motion of the water.

Another mode of kinetic energy conversion is due to the acceleration of the water particles beneath the surface. As the flow oscillates backwards and forwards, and to a lesser extent (in shallow water) upwards and downwards, the water particles speed up then slow down and stop and then reverse direction. These accelerations are well known to impart significant forces on submerged bodies and are often termed acceleration forces or added-mass forces. The latter term refers to the fact that the forces imparted to the body result from the added mass of water that must be accelerated to pass around a body. Across the range of wave conditions suitable for operation of the device, the acceleration forces are often dominant relative to the other forces described above. Motion of the device 10 is optimally controlled, such that all forces are utilised to maximise the energy conversion efficiency.

The device 10 is adapted for installation in intermediate water depths of around 15-45 m, such that the blades 28, when oriented vertically, extend slightly above the mean water level. In such water depths, the water particle motions are predominantly horizontal, but also have a smaller vertical component, with the flow oscillating forwards and backwards in the direction of wave propagation. As the waves propagate past the blades 28, the water motion imparts a time-varying force on the blades 28. This force, which oscillates forwards and backwards, causes the blades 28 and axle 20 to angularly oscillate, about the pivotal axis 22, thus driving the motor/generator 30 and generating electrical power. The nature of this oscillating force is partly described by Morrison's equation, which has the form, $$F = Cd(\tfrac{1}{2}\rho U^2) * A + Cm(\rho dU/dt) * V,$$

where the first term arises due to the hydrodynamic drag (as described above) on the blades 28 and the second term is due to the acceleration of water around the blades 28 (as described above). Therefore, the device 10 makes use of forces due to both velocity and acceleration of the water. In some instances the drag and acceleration forces can be counter to each other over part of the wave. The blade shape and orientation can be optimised to preferentially utilise either the acceleration or the drag force.

Figure 7:
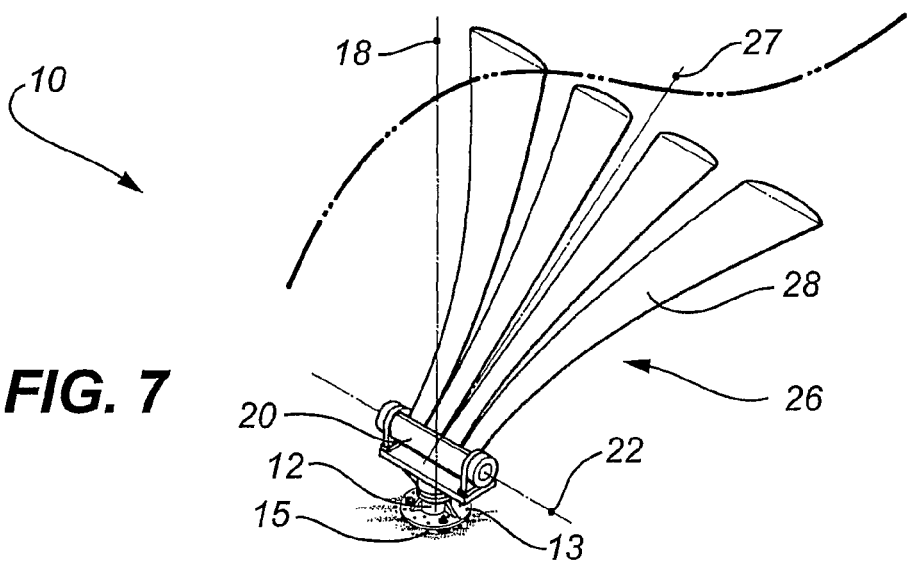
FIG. 7 is a schematic perspective view of the system of FIG. 5, shown in an operational mode for large waves.
Figure 8:
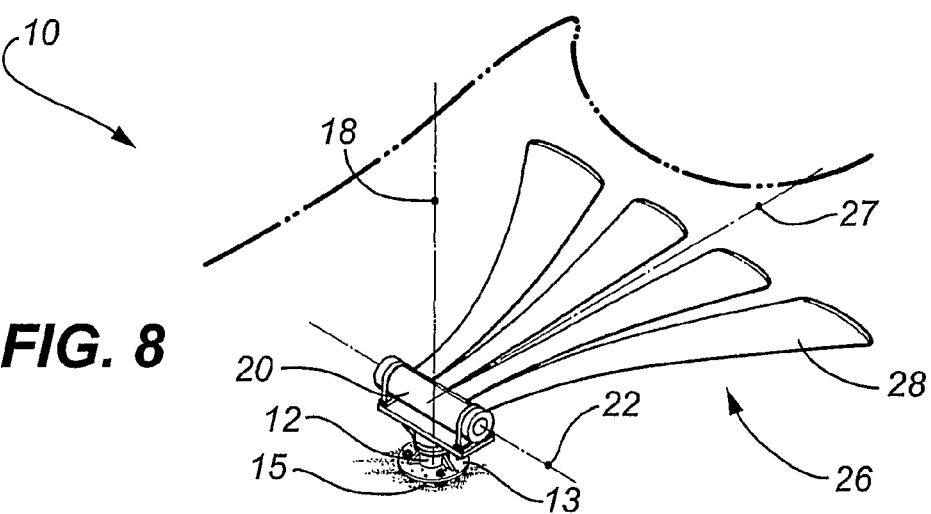
FIG. 8 is a schematic perspective view of the system of FIG. 5, shown in an operational mode for extreme hurricane or cyclone conditions.
Figure 9:
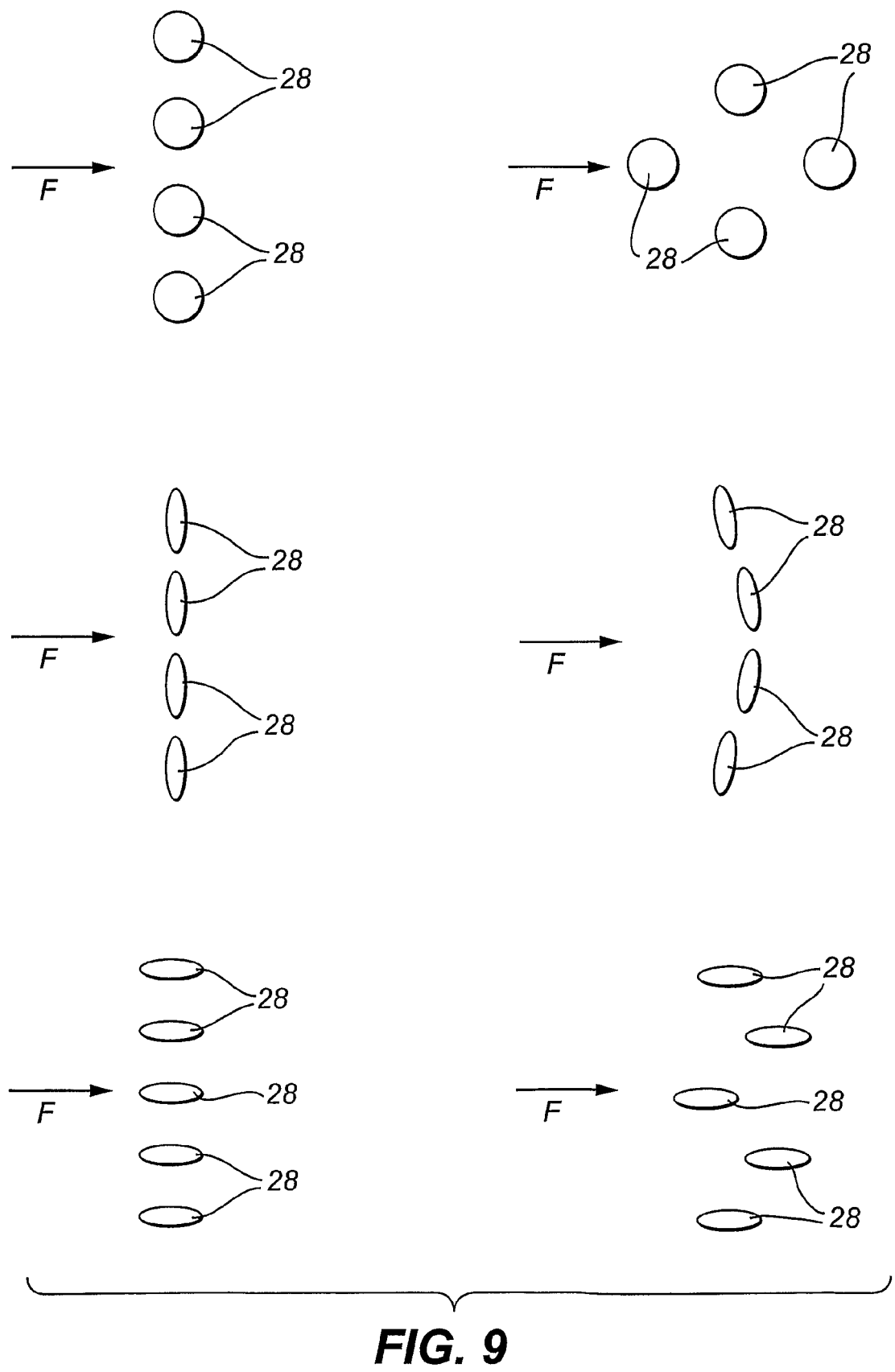
FIG. 9 shows horizontal cross-sectional views through several alternative blade embodiments.

The streamlined orientation shown in FIGS. 1 to 4 preferentially maximises acceleration forces while the oblique orientation shown in FIGS. 5-8 preferentially maximises the drag forces. Other possible beneficial blade shapes and configurations are shown in FIG. 9, where more complex interactions between the blades and fluid motions may be utilised. In FIG. 9, arrow F indicates the direction of propagation of the waves.

In addition, the deflection of the free-surface due to passing waves causes a mass of water to accumulate on the seaward side of the array of blades 28. This results in a difference in hydrostatic pressure across the array and a net force tending to angularly oscillate the axle 20 in the same direction as the other noted forces. The sum effect of all of these forces is to efficiently drive the axle 20 in an angular oscillating manner such that power is produced on both the forward and backward strokes.

Depending on the wave conditions, which are generally characterized by the wave height and period, the range of motion of the paddle 26 is adjusted to optimize the power conversion and to prevent damage to the device 10. This is achieved using a paddle adjustment assembly associated with the paddle 26. The paddle adjustment assembly includes a sensor (not shown) for sensing a value indicative of the wave forces applied to the paddle 26, and a controller (not shown) responsive to the sensor for controlling the application of external power to the motor/generator 30 to adjust the magnitude and/or angular position of the angle range through which the paddle 26 oscillates relative to the pivotal axis 22.

Figure 2:
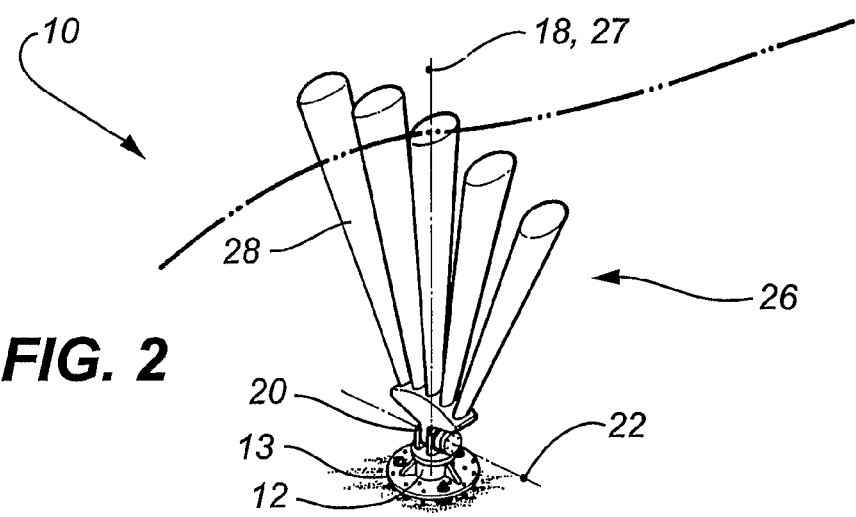
FIG. 2 is a schematic perspective view of the system of FIG. 1, shown in an operational mode for normal wave conditions.
Figure 6:
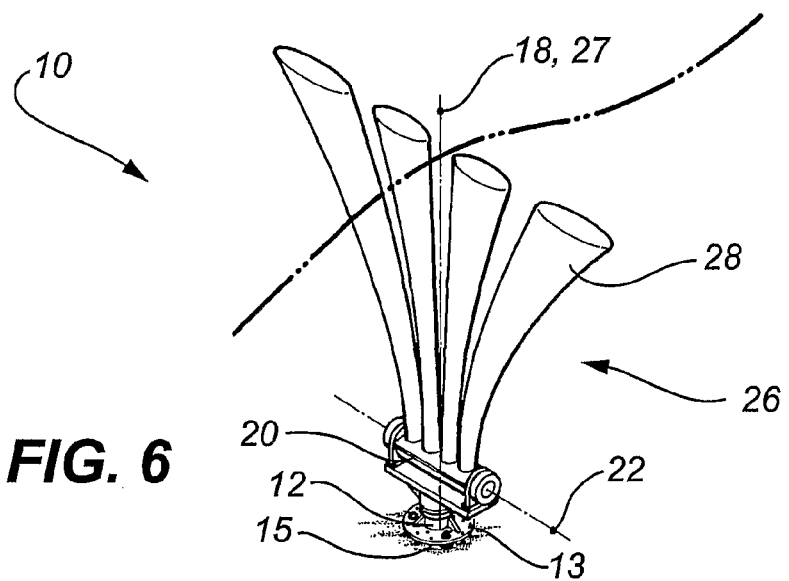
FIG. 6 is a schematic perspective view of the system of FIG. 5, shown in an operational mode for normal wave conditions.

In normal operating conditions, when there is a low risk of structural damage to the device, and it is desired to convert a maximum amount of incident power, the paddle 26 is configured to oscillate about a near-vertical plane, as shown in FIGS. 2 and 6.

Figure 3:
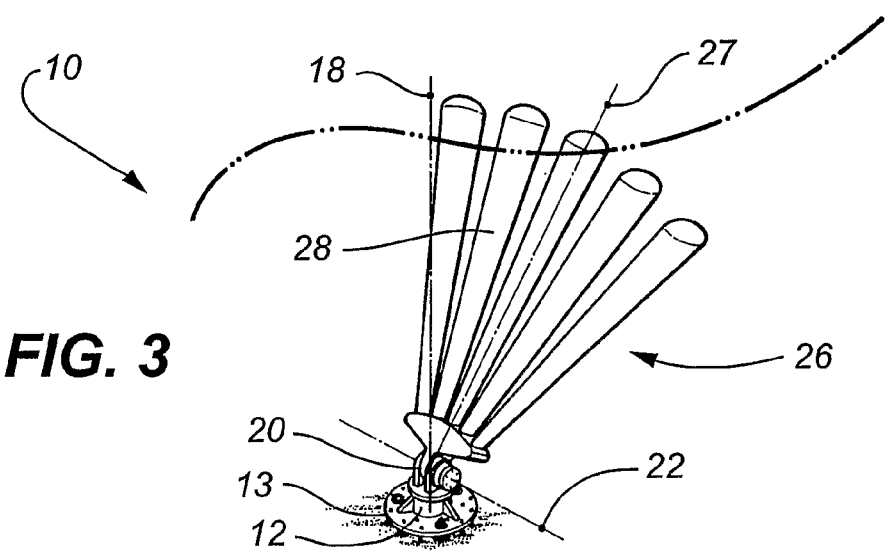
FIG. 3 is a schematic perspective view of the system of FIG. 1, shown in an operational mode for large waves.

When sufficiently large waves occur, the sensor (not shown) senses a value indicative of wave forces that may damage the paddle 26. In response, the controller (not shown) controls the application of external power to the motor/generator 30 to drive the paddle 26 into a configuration in which the mean position of the paddle 26 is inclined relative to axis 18, as shown in FIGS. 3 and 7, such that some of the wave energy is allowed to pass unharnessed and the device 10 can continue to function safely. The inclined position is maintained by adjusting the resistance exposed to the motor/generator 30, such that the restoring forces (primarily due to buoyancy) under large waves are not sufficient to raise the device above a predetermined level. The motor/generator 30 can also draw external power from an electricity distribution grid during short intervals to brake the motion of the paddle 26 in a controlled manner and thereby limit its range of oscillation.

Figure 4:
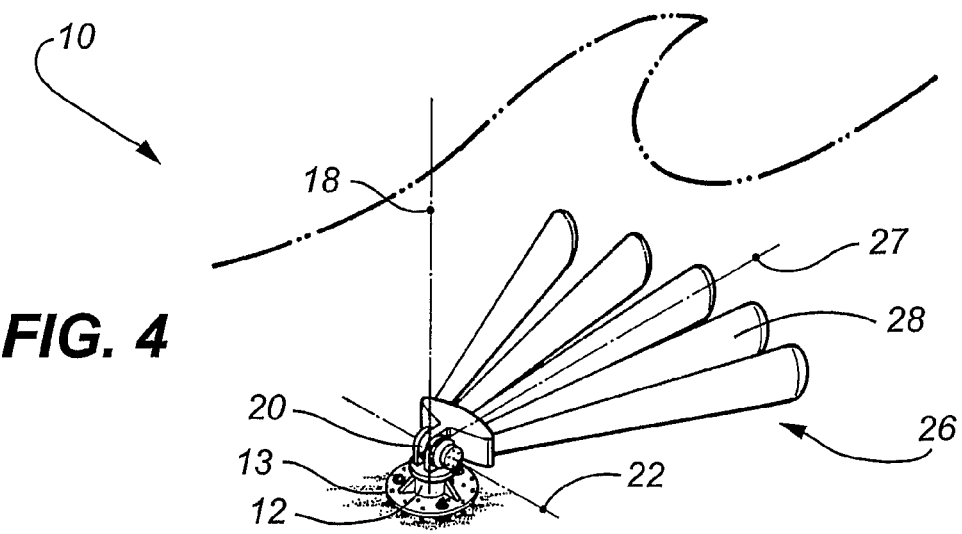
FIG. 4 is a schematic perspective view of the system of FIG. 1, shown in an operational mode for extreme hurricane or cyclone conditions.
Figure 5:
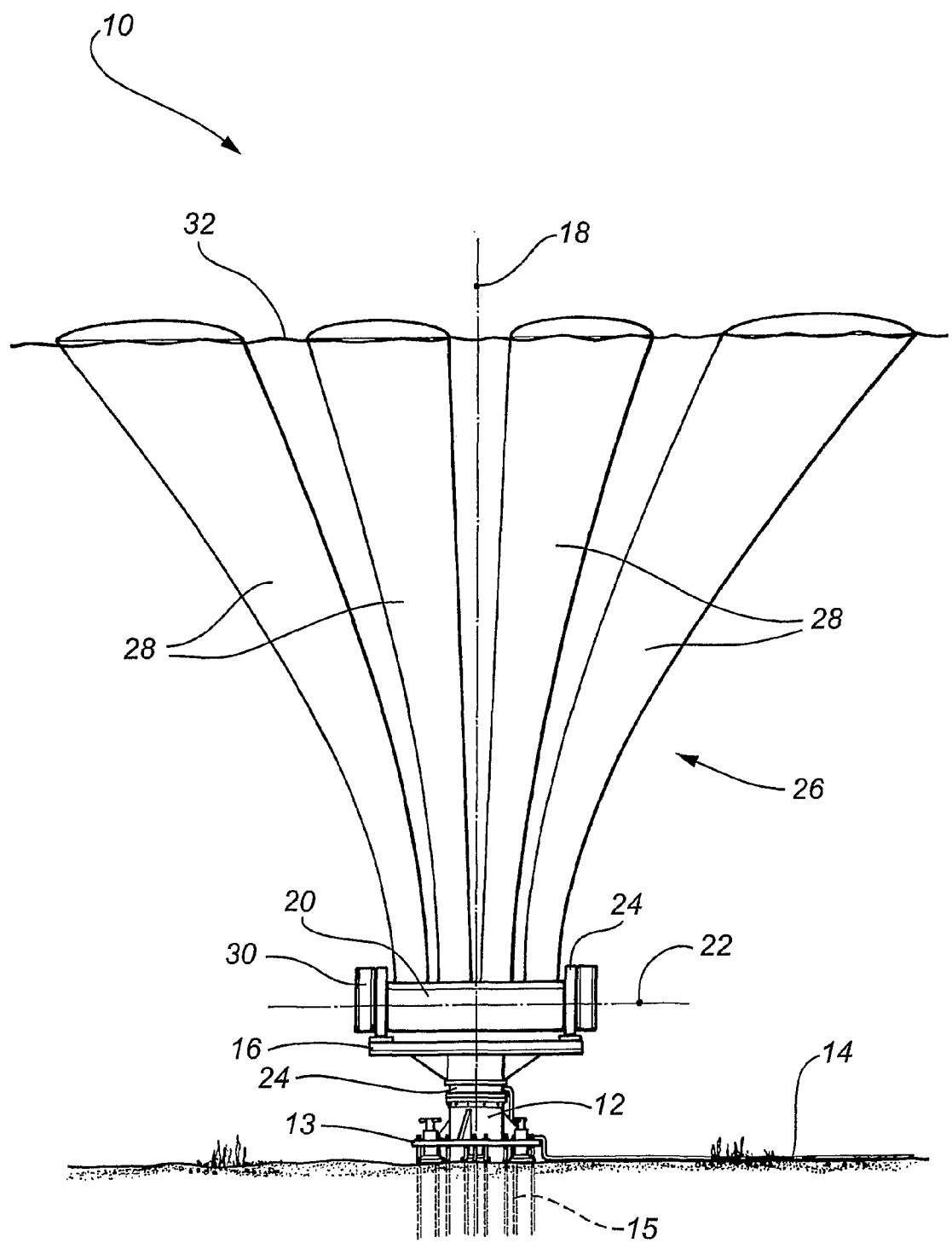
FIG. 5 is a schematic front elevational view of an alternative embodiment of a wave energy capturing device according to the present invention.

In the rare event that hurricane or cyclone conditions occur, the sensor senses a value indicative of wave forces applied indicative of an extreme event. In response, the controller controls the application of external power to the motor/generator 30 to drive the paddle 26 into a streamlined configuration flat against the ocean floor, as shown in FIGS. 4 and 8. The paddle 26 is held stationary in this position by the continued application of a relatively small amount of external power to the motor 30. In this position, the blades 28 are removed from the path of large forces due to hurricane waves, and are aligned with any small bottom velocities, such that wave forces are minimised and the device 10 remains protected against damage.

When the extreme event passes, the sensor detects a return to more normal conditions, and the controller controls the application of external power to the motor/generator 30 to raise the paddle 26 from parallel with the ocean floor into a mean position in which the wave forces applied to the paddle 26 are increased. If, in this new position, the sensor senses a value indicative of wave forces that will not damage the device 10 and which are less than optimal in terms of wave energy capturing efficiency, then the controller in response controls the application of external power to the motor 30 to further raise the paddle 26.

The device 10 is also provided with a sensor (not shown) for detecting the presence of nearby moving structures, such as boats and whales. The controller (not shown) is also responsive to this sensor to move the paddle 26 into the streamlined configuration shown in FIGS. 4 and 8 until the structure moves out of range.

The base 12 forms part of a mooring for connecting the device 10 to the seabed 16. The mooring is disclosed in detail in the Applicant's earlier filed Australian Provisional Patent Application No. 2006904030 and the co-pending international patent application claiming Convention priority therefrom, the disclosures of which are incorporated herein by reference.

The device 10 can be installed as a single unit, or can be installed in multiples to form a wave energy farm, with power linked in a DC-bus and delivered ashore via a single cable.

It will be appreciated that the various operating modes allow the device 10 to operate in all but the rarest and most extreme conditions. This is a clear advantage over known wave energy devices, which become inoperable in moderately large waves. A further advantage is that the device 10 can be installed in cyclone and hurricane prone regions, where most other known wave energy devices could not be used, as they would not survive the prevailing ocean conditions. It will also be appreciated that the size and weight of the device 10 is advantageously reduced compared to known wave energy capturing devices, as the device 10 adjusts its configuration depending on prevailing ocean conditions. Accordingly, the cost of manufacturing and installing the device 10 is reduced compared to similar known devices. Another advantage of the device 10 is that the use of an array of spaced blades 28, which allows a large portion of the energy in each wave to be absorbed, with minimal reflection occurring. The device 10 also advantageously self-orients with the direction of wave propagation to maximise its wave energy capturing efficiency. A further advantage is that the use of a streamlined blade configuration allows for preferential capture of wave acceleration forces, and the use of an oblique blade configuration allows for preferential capture of wave drag forces.

While the present invention has been described with reference to a specific embodiment, it will be appreciated that it may also be embodied in many other forms. For example:

the blades can be arranged horizontally instead of vertically;

the paddle can drive a reciprocating seawater pump to create high pressure seawater to be used for desalination or for driving other external devices;

the blades may be aligned along more than one axis, or in a circular or other arrangement;

the blades may enclose a means for adjusting their internal weight distribution by changing the position of a mass, or by taking in or expelling seawater, as a means of altering the response to the waves to maximise efficiency;

the blades may be substantially flexible, or articulated at one or more joints, as a means of achieving a motion response which increases the transfer of energy to the motor/generator 30;

the blades may be substantially submerged when vertically oriented at mean sea level, or they may protrude slightly from the sea surface; and/or a single device may be fitted with more than one motor/generator, each attached to a separate paddle, and with each moving relative to the other such that a beneficial interaction is achieved leading to an increase in efficiency.

The invention claimed is:

1. A wave energy capturing device comprising:
   a base adapted for fixed connection to a submerged surface; and
   at least one elongate buoyant paddle having an array of spaced apart blades, said paddle having a longitudinal axis, an upper end portion and a lower end portion and being pivotally mounted to said base, about a first pivotal axis for angular oscillation through an angle range when wave motion applies a force to said paddle; and
   an energy transfer member attached to said paddle and adapted to be driven by the angular oscillation of said paddle.

2. A wave energy capturing device according to claim 1, further comprising a machine connected to said paddle for extracting energy from oscillatory motion of said paddle.

3. A wave energy capturing device according to claim 2, wherein said machine is adapted to receive a torque from said energy transfer member.

4. A wave energy capturing device according to claim 2, wherein said machine can function as both a motor and a generator.

5. A wave energy capturing device according to claim 2, further comprising a paddle adjustment assembly associated with the paddle and adapted to adjust said angle range in magnitude and/or angular position relative to said first pivotal axis.

6. A wave energy capturing device according to claim 5, wherein said paddle adjustment assembly comprises the machine and wherein the machine is adapted to receive external power to adjust the position of the paddle.

7. A wave energy capturing device according to claim 5, wherein the paddle adjustment assembly is adapted to move the paddle into one of at least three configurations comprising:
   a first configuration in which the mean position of the longitudinal axis of the paddle is further inclined relative to a vertical plane drawn perpendicular to a direction of wave propagation; and
   a second configuration in which the paddle is maintained substantially parallel to the direction of wave propagation.

8. A wave energy capturing device according to claim 1, wherein said blades are spaced apart generally along said first pivotal axis.

9. A wave energy capturing device according to claim 1, wherein the array of blades fans outwardly from an end closest the base to an opposite free end.

10. A wave energy capturing device according to claim 1, wherein the blades include substantially streamlined leading edges.

11. A wave energy capturing device according to claim 1, wherein said blades include generally oblique leading edges.

12. A wave energy capturing device according to claim 1, wherein said paddle is self-orienting with respect to the direction of wave propagation.

13. A wave energy capturing device according to claim 12, wherein said paddle is adapted to be pivotally mounted relative to the submerged surface about a second pivotal axis, which is generally perpendicular to said first pivotal axis.

14. A wave energy capturing device according to claim 13, wherein the base is adapted to be pivotally mounted to the submerged surface.

15. A wave energy capturing device according to claim 13, wherein the base is adapted to be fixed to the submerged surface and the paddle is pivotally mounted to the base about said second pivotal axis.

16. A wave energy capturing device according to claim 13, wherein, in use, said second pivotal axis is substantially vertical.

17. A wave energy capturing device according to claim 1, further comprising an axle pivotally connected to said base about said first pivotal axis, and wherein said paddle is fixedly connected to and extends from said axle.

18. A wave energy capturing device according to claim 17, wherein said axle is connected to the base via a bracket that is pivotally mounted to said base about a second pivotal axis, which is generally perpendicular to said first pivotal axis.

19. A wave energy capturing device according to claim 18, wherein, in use, said second pivotal axis is substantially vertical.

20. A wave energy capturing device according to claim 1, wherein, in use, said first pivotal axis is substantially horizontal.

* * * * *